May 6, 1969  C. GUILLOT ET AL  3,442,060
PERFORATED PLATE AND TANK FITTED THEREWITH
Filed June 22, 1965

INVENTORS
CLAUDE GUILLOT
ALPHONSE PEUCHMAUR
BY Bacon & Thomas
ATTORNEYS

United States Patent Office 3,442,060
Patented May 6, 1969

3,442,060
PERFORATED PLATE AND TANK
FITTED THEREWITH
Claude Guillot, L'Horme, Loire, and Alphonse Peuchmaur, Boulogne-sur-Seine, France, assignors to Commissariat à l'Energie Atomique, Paris, France
Filed June 22, 1965, Ser. No. 465,924
Claims priority, application France, June 24, 1964, 979,425
Int. Cl. E04c 5/04, 2/42
U.S. Cl. 52—673                                5 Claims

ABSTRACT OF THE DISCLOSURE

The plates, adapted particularly for forming the end shields of nuclear reactor vessels, are formed by welding the abutting flanges of a plurality of elongated I-beams together. The webs of the I-beams are relatively thick and are provided with a plurality of uniformly spaced bores which open onto the outer surface of the I-beam flanges. A shell or casing may enclose the plates and the opposite ends of pressure tubes may be mounted in the bores of a pair of opposed plates and a cooling fluid may be circulated through the passages formed between the webs of adjacent beams.

---

Perforated walls which are intended, for example, to support tubes are usually formed by two parallel plates provided with tubular spacers which pass through said plates and are welded thereto and which serve to secure the tubes in position.

The wall which is thus formed therefore comprises an extensive network of welds and is even partly constituted by the weld metal. In order to avoid any impairment of the strength of said wall, it is therefore necessary to inspect these welds constantly. However, the large number and complexity of distribution of said welds over the wall surfaces makes it very difficult to check them and even more difficult to provide ready access thereto for the purpose of effecting any finishing touches or repairs which may prove necessary.

The object of the present invention is to overcome the above noted disadvantages.

The invention is accordingly directed to a perforated plate which is essentially constructed of I-section structural girders, the webs of said girders being pierced by uniformly spaced bores and welded side by side along the longest dimensions thereof, thus forming between two adjacent structural girders a longitudinal passage which is open at both ends thereof.

Said perforated plate is provided only with parallel weld seams having a surface area with respect to the remainder of the wall which is sufficiently small to play practically no part in the strength of said wall. The simplicity and uniformity of said weld seams make is possible in addition to check them easily and to gain ready access thereto for repair purposes whenever this should prove necessary.

The invention further extends to tanks which are fitted with at least one perforated plate and especially to nuclear reactor vessels, the end shields of which consist of structural girders welded side by side so that the bores which are formed therein are spaced at a predetermined pitch on a lattice having the shape of a parallelogram, the peripheral zone being without bores and the parallel spaces between the structural girders being intended to constitute passages for circulating a cooling fluid therein.

A number of other advantages and characteristic features of the invention will in any case appear from the following detailed description of one form of embodiment which is given solely by way of example and not in any limiting sense, reference being made to the accompanying drawings, wherein.

Figure 1:
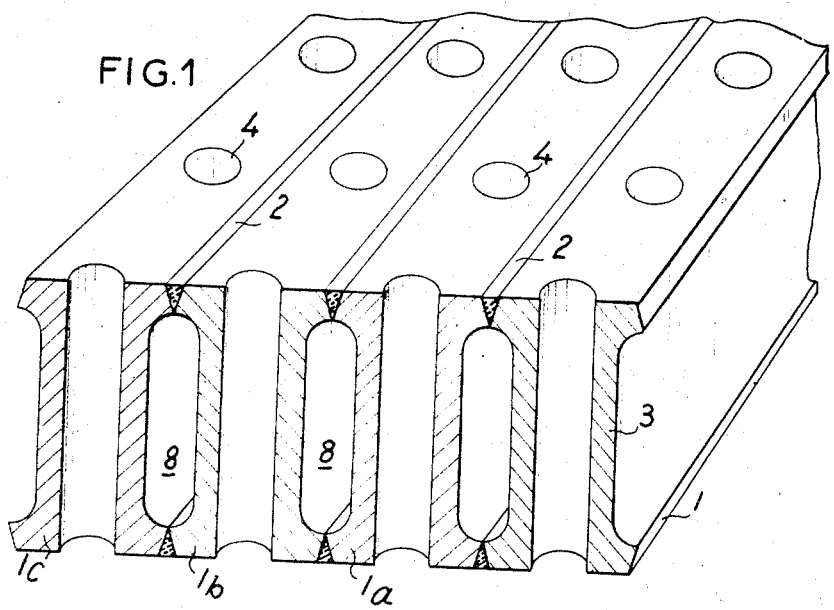
FIG. 1 represents in perspective a portion of a perforated plate in accordance with the invention.

A perforated wall which is designed to support tubes comprises, as shown in FIG. 1, a series of structural metal members 1, 1a, 1b etc., for example steel members, which have an I-shaped cross-section and are secured to each other side by side. These structural metal members or I-girders are welded to each other at 2 in the lengthwise direction along the lateral edges of the flanges of each I, that is to say along the longest dimensions of the girders.

Between the parallel straight lines 2 of the weld seams thus formed, the webs 3 of the I-girders are provided with bores 4 which are uniformly spaced on lines which are parallel to the weld seams 2. Said bores 4 are pierced through the entire thickness of the web 3 of the I and therefore serve as passageways in order that, for example, fluid delivered from the tubes which are intended to be secured to the bores may accordingly flow through the wall from one side to the other.

The girders may also be provided with extended portions, not shown, at the level of said bores 4 in order to facilitate the positioning of said tubes.

The number and spacing of the bores can of course vary according to the intended function of the tubes to be supported. However, the bores are preferably not pierced over the full length of the girders, the ends of which are thus left solid. It is thus possible, as shown in FIG. 2, to form within the wall a reinforced peripheral zone 5 in which no bores are formed.

Figure 2:
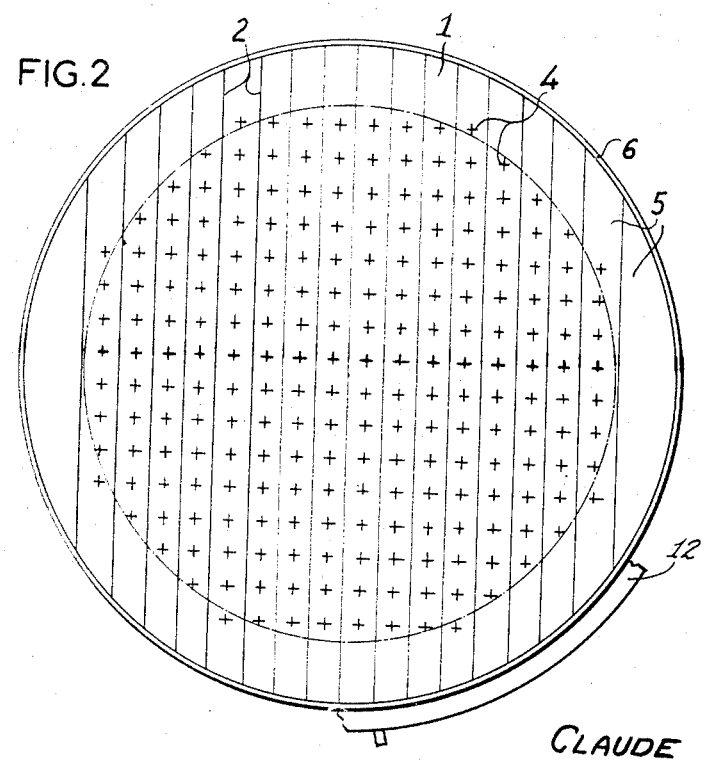
FIG. 2 represents diagrammatically an overhead view of a perforated plate in accordance with the invention.

FIG. 2 shows a form of embodiment in which the wall is intended to constitute the flat end shield of a cylindrical tank such as a nuclear reactor vessel. In this case, the girders have unequal lengths and are slightly rounded at their extremities in order to correspond exactly in shape to that of a cylindrical shell 6 which surrounds the girder extremities.

In the central portion, said bores 4 are spaced at a predetermined pitch on a lattice which is represented in the figure as a square lattice but which, as will be readily understood, could equally well have the configuration either of a lozenge or of any other parallelogram as obtained by displacing the girders relatively to each other. It would also be possible to provide a different spacing of the bores in order to obtain a rectangular lattice pitch. In this case, the mass of metal which has not been employed in the web of each girder is accordingly reduced and access to the longitudinal weld seams is thereby improved.

The spaces 8 between the girders form passages through which can be circulated a cooling fluid such as water as supplied through a manifold 12 secured to the cylindrical shell which surrounds the perforated wall.

There is thus obtained a flat end-shield having straight and parallel weld seams which can be checked without difficulty.

A flat end shield as thus designed is particularly well suited to the construction of a nuclear reactor vessel which is usually provided with two identical end shields between which pressure tubes are mounted. These end shields are accordingly made up of two perforated walls according to the invention, the pressure tubes being fitted within the bores 4 of said walls. A cylindrical shell 6 surrounds the assembly and contains a moderator and reflector such as heavy water between the two walls. A cooling fluid can also be circulated within the interior of the end shields themselves through the passages 8.

Safety and strength of said vessel end shields is ensured by the limitation of the weld seams to parallel lines and rapid and effective checking of welds is permitted by the absence of any T-junction or cross welding. Moreover, the weld lines referred-to are parallel to the lines of the tube-support bores and can therefore be reached not only by weld-testing equipment but also by a repair unit whenever it may prove necessary to strengthen the weld seams.

Said seams in any case only constitute a very small proportion of the surface area of the wall and the strength of the girders can easily be made sufficient to ensure that the welded joints are practically not required to contribute thereto.

Such an assembly of I-section girders by means of simple rectilineal weld seams can readily be performed on site without any preliminary preparation in the workshops. This eliminates the considerable difficulties which would otherwise be involved in transportation and positioning, especially in the case of such substantial structures as nuclear reactor vessels.

It will be wholly apparent that a number of different modifications could be made in the form of embodiment which has just been described without thereby departing from the scope of the invention. In particular, a certain number of transverse bores not shown could be formed in the girders with a view to providing a communication between the coolant passages 8. The tank or the nuclear reactor vessel could have any shape, whether prismatic or cylindrical, the lengths of the I-section girders being determined accordingly.

End fittings could also be fixed, for example by welding, around the bores so as to facilitate the positioning of the tubes, the top and bottom faces of the girders being flat.

What we claim is:

1. A perforated plate for supporting tubes, comprising: a plurality of elongated, generally I-shaped metal beams, each having longitudinal flanges and a relatively thick web, disposed in side-by-side relationship with the lateral edges of the flanges of adjacent beams in abutment throughout their entire length and with the webs of adjacent beams being spaced apart, continuous welds connecting the flanges of adjacent beams together from one end to the other end thereof to form a plate, the space between adjacent webs forming continuous passageways between adjacent beams which are open at both ends and extend from one end to the other end of said beams, said beams being formed with a plurality of spaced bores extending entirely therethrough from the outer surface of one flange, through said thick web, and to the outer surface of the other flange, said bores being disposed substantially normal to the length of the beams and to the outer surface of said flanges.

2. A perforated plate according to claim 1 wherein only the central portion of each of said beams is formed with uniformly spaced bores, the portion of each of said beams adjacent the opposite ends thereof, being unperforated by bores.

3. A perforated plate according to claim 1 wherein the axes of said bores in said plate are parallel and said welds between adjacent beams are parallel and spaced from the openings at the ends of said bores.

4. A flat end shield for a tank, comprising: a plurality of elongated, generally I-shaped metal beams, each having longitudinal flanges and a relatively thick web, disposed in side-by-side relationship with the lateral edges of the flanges of adjacent beams in abutment throughout their entire length and with the webs of adjacent beams being spaced apart, continuous welds connecting the flanges of adjacent beams together from one end to the other end thereof to form an end shield, the space between adjacent webs forming continuous passageways between adjacent beams which are open at both ends and extend from one end to the other end of said beams, each of said beams being formed with a plurality of spaced bores extending entirely therethrough from the outer surface of one flange, through said thick web, and to the outer surface of the other flange, said bores being disposed substantially normal to the length of the beams and to the outer surface of said flanges and being arranged to have the shape of a parallelogram spaced a short distance from the periphery of said plate.

5. A flat end shield for a tank according to claim 4 wherein said beams are of different lengths and the periphery of said shield is circular, and the shell of a tank surrounds and engages the periphery of said shield.

References Cited

UNITED STATES PATENTS

| | | | |
|---|---|---|---|
| 659,602 | 10/1900 | Bredel | 52—607 |
| 815,641 | 3/1906 | Schoenmen | 52—607 |
| 2,614,034 | 10/1952 | Brummerstedt | 52—673 |
| 3,076,317 | 2/1963 | La Fave | 52—249 |

BOBBY R. GAY, *Primary Examiner.*

R. D. KRAUS, *Assistant Examiner.*

U.S. Cl. X.R.

165—134